United States Patent
Maier

(10) Patent No.: US 7,099,133 B2
(45) Date of Patent: Aug. 29, 2006

(54) SENSOR PROTECTION CIRCUIT

(75) Inventor: Thomas Maier, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/521,888

(22) PCT Filed: Jul. 1, 2003

(86) PCT No.: PCT/DE03/02189

§ 371 (c)(1),
(2), (4) Date: Jul. 28, 2005

(87) PCT Pub. No.: WO2004/017481

PCT Pub. Date: Feb. 26, 2004

(65) Prior Publication Data
US 2006/0114632 A1 Jun. 1, 2006

(30) Foreign Application Priority Data
Jul. 19, 2002 (DE) .............................. 102 32 941

(51) Int. Cl.
H02H 3/20 (2006.01)

(52) U.S. Cl. .................................. 361/91.5

(58) Field of Classification Search ............... 361/91.1, 361/91.5
See application file for complete search history.

(56) References Cited

U.S. PATENT DOCUMENTS 5,414,792 A * 5/1995 Shorey ........................ 388/811
6,538,866 B1 * 3/2003 Hanzawa et al. .......... 361/91.1

FOREIGN PATENT DOCUMENTS

EP 0497478 S2 8/1992
EP 0552471 A1 7/1993

* cited by examiner

Primary Examiner—Phuong T. Vu
Assistant Examiner—Lucy Thomas
(74) Attorney, Agent, or Firm—Laurence A. Greenberg; Werner H. Stemer; Ralph E. Locher

(57) ABSTRACT

The invention relates to a sensor protection circuit for at least one sensor (6), especially in a motor vehicle electric system, comprising at least one supply line (3, 4) for supplying current to the sensor (6) and a current measuring unit (8) for detecting the electric current flowing through the supply line (3), in order to prevent damage to the sensor (6) as a result of excess voltage. Said current measuring unit (8) is connected to a current limiting device or to a switch element in order to limit the current or to disconnect the supply line (3).

9 Claims, 2 Drawing Sheets

SENSOR PROTECTION CIRCUIT

BACKGROUND OF THE INVENTION

Field of the Invention

The invention relates to a sensor protection circuit, in particular in a motor vehicle electric system, having at least one supply line for supplying current to the sensor.

Numerous sensors are typically used in modern motor vehicles to detect the state of the motor vehicle or the environment. Power can be supplied to the sensors by means of separate supply lines which are not part of the motor vehicle electric system. This is advantageous in that the sensor interrogation is, as a rule, not interrupted by the significantly higher load currents of the motor vehicle electric system.

A network voltage of 12 V has hitherto been the norm in motor vehicle electric systems, whereas power is supplied to the sensors at a lower voltage of 5 V for example. If there is a short circuit between a supply line of a sensor and the voltage conducting line of the motor vehicle electric system, the higher electric system voltage of 12 V is applied to the sensors, which could result in damage to the sensors. It is therefore known to provide the sensors with a passive protection circuit which also prevents damage to the sensors caused by a short circuit between a supply line for the sensors and the motor vehicle electric system, so that the sensors are short-circuit stable up to the motor vehicle electric system voltage of 12 V. This type of protective circuit for the sensors can comprise Zener diodes or capacitors for example.

Motor vehicle electric systems with a voltage of 42 V are however under development as a result of the increasing energy requirement of electrical motor vehicle components. As a rule the short-circuit stability of the known sensors is however not sufficient to withstand a short circuit in respect of a voltage of 42 V, so that known sensors would be damaged in the event of a short circuit if used in a modern motor vehicle electric system with a voltage of 42 V.

One possible solution to this problem lies in developing new sensors with a correspondingly high short-circuit stability, which however would involve considerable development costs.

SUMMARY OF THE INVENTION

The object of the invention is thus to enable the use of known sensors with a short-circuit stability up to a voltage of 12 V in a modern motor vehicle electric system with a voltage of 42 V, without risking damage to the sensors in the event of a short circuit.

The object is achieved by the features of Claim 1.

The invention comprises the general technical disclosure of applying a sensor protection system which detects the current increase on the supply line with a short circuit of a supply line for a sensor, thereby enabling the introduction of suitable countermeasures.

If a fault occurs, the excess voltage protection for the sensor first comes into effect. Fast fault recognition and a similarly rapid introduction of countermeasures allow the use of sensors with a short-circuit stability lying below the nominal voltage of the electric system.

This advantageously enables the use of conventional sensors with a short circuit stability of 12 V in future motor vehicle electric systems with a network voltage of 42 V, without costly new developments of the sensors being necessary.

In the simplest case, the countermeasures employed in the event of a short circuit can consist of the supply line for the sensor being disconnected by a circuit element, thereby preventing a further current increase. The disconnection of the supply line for the sensors can optionally take place at one pole for the ground line or the voltage line or at two poles for the ground line and the voltage line, whereby a circuit element is preferably used which is switched in sequence with a supply line.

In this version of the invention, the circuit element can be activated externally in order to disconnect the supply line for the sensors independently from the current on the supply line, the sensor protection circuit preferably comprising a separate control input. This separate disconnection can be software-controlled for example, if a short circuit lasts for a predetermined time.

As a countermeasure in the event of a short circuit of a supply line for a sensor, it is preferable that the supply line is not completely disconnected but that a current limitation on the supply line for the sensor is instead implemented in order to prevent damage to the sensor.

The current on the supply line for the sensors is preferably measured on the ground line, however it is essentially also possible to measure the current on the voltage line of the sensors.

Furthermore the sensor protection circuit according to the invention preferably also comprises a passive protective circuit in order to prevent damage to the sensors in the event of a short circuit.

A protective circuit of this type can comprise capacitors or Zener diodes for example, whereby these components can be switched between the two supply lines for the sensors.

However, it is also possible for the components of the passive protective circuit to connect the ground line and/or the voltage line of the sensors to ground respectively.

The use of Zener diodes as passive protective circuits is advantageous if the Zener diodes in the sensor protection circuit according to the invention have a lower breakdown voltage than the Zener diodes which are typically provided in the sensors as protective circuits. This is advantageous since after a short build-up phase, the short circuit current flows exclusively through the Zener diodes in the sensor protection circuit and no longer through the Zener diodes in the sensors, so that the Zener diodes in the sensors only have to carry the short circuit current for a very short period of time.

The term sensor used within the context of the invention is generally understood to comprise all components which are electrically supplied and provide a measurable variable. By way of example, Lambda sensors, temperature sensors, pressure sensors, inclination sensors and acceleration sensors are worth mentioning.

Nor is the invention limited to use in future motor vehicle electric systems having a network voltage of 42 V. Instead it is also possible as a result of a corresponding standardization that electric circuits with other network voltages will be developed in which the sensor protection circuit according to the invention will also be able to be used.

Other advantageous embodiments of the invention are set down in the subclaims and are described below together with the description of the preferred exemplary embodiment of the invention with reference to the drawings, in which:

DESCRIPTION OF THE PREFERRED EMBODIMENTS

Figure 1:
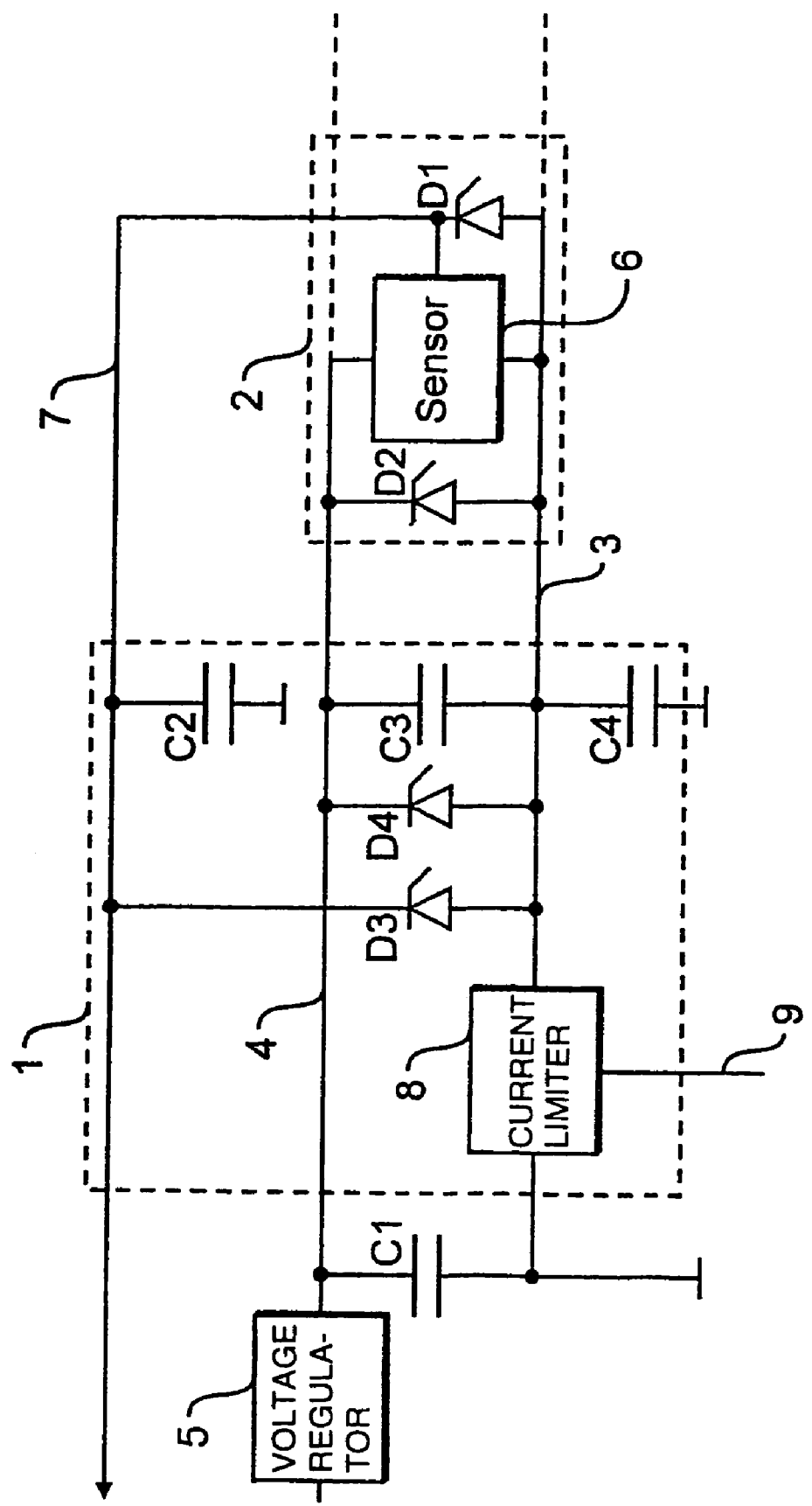
FIG. 1 shows a sensor protection circuit according to the invention with a sensor in the form of a circuit diagram.

The circuit diagram displayed in FIG. 1 shows a sensor protection circuit 1 according to the invention which is used in a motor vehicle electric system with a network voltage of 42 V, to enable a conventional sensor unit 2 with a short circuit stability of 12 V to be operated in the event of a short circuit without damaging the sensor unit 2 or completely destroying it.

For clarification purposes, FIG. 1 only shows the sensor unit 2, however several sensor units can be operated on the sensor protection circuit 1, as indicated by the dashed lines.

For supplying current to the sensor unit 2, the sensor protection circuit 1 comprises a ground line 3 and a voltage line 4, whereby the voltage line 4 is connected on one side to a voltage regulator 5, which adjusts the voltage on the voltage line 4 to the operating voltage of the sensor unit 2, amounting to 5 V in this exemplary embodiment. In contrast, the ground line 3 is connected to ground, with a buffer capacitor C1 arranged at the input of the sensor protection circuit 1 between the voltage line 4 and the ground line 3.

The sensor unit 2 comprises the actual sensor 6, which measures the physical variable quantity, such as temperature, pressure, or air-fuel ratio λ and outputs a corresponding measurement signal via a signal line 7.

Furthermore, the sensor unit 2 comprises a passive protective circuit in order to prevent damage to the sensor 6, in the case of a short circuit, with the passive protective circuit of the sensor unit 2 being designed for the hitherto conventional electric system voltage of 12 V.

The passive protective circuit of the sensor unit 2 comprises a Zener diode D1 on the one hand, having a breakdown voltage of $U_{Z1}=16V$, whereby, in the event of an excess voltage, the Zener diode D1 prevents an input-side overload of the sensor 6. The Zener diode D1 is thus switched between the signal line 7 and the ground line 3.

Furthermore, the passive protective circuit of the sensor unit 2 comprises a further Zener diode D2 having a breakdown voltage of $U_{Z2}=16V$, which prevents an input-side excess voltage of the sensor 6 in the event of an excess voltage. The Zener diode D2 is thus switched between the voltage line 4 and the ground line 3.

The passive protective circuit of the sensor unit 2 only offers short circuit stability in relation to the hitherto conventional electric system current of 12 V, whereas the passive protective circuit of sensor unit 2 is overstrained if used in a modern motor vehicle electric system with a voltage of 42 V.

Figure 2:
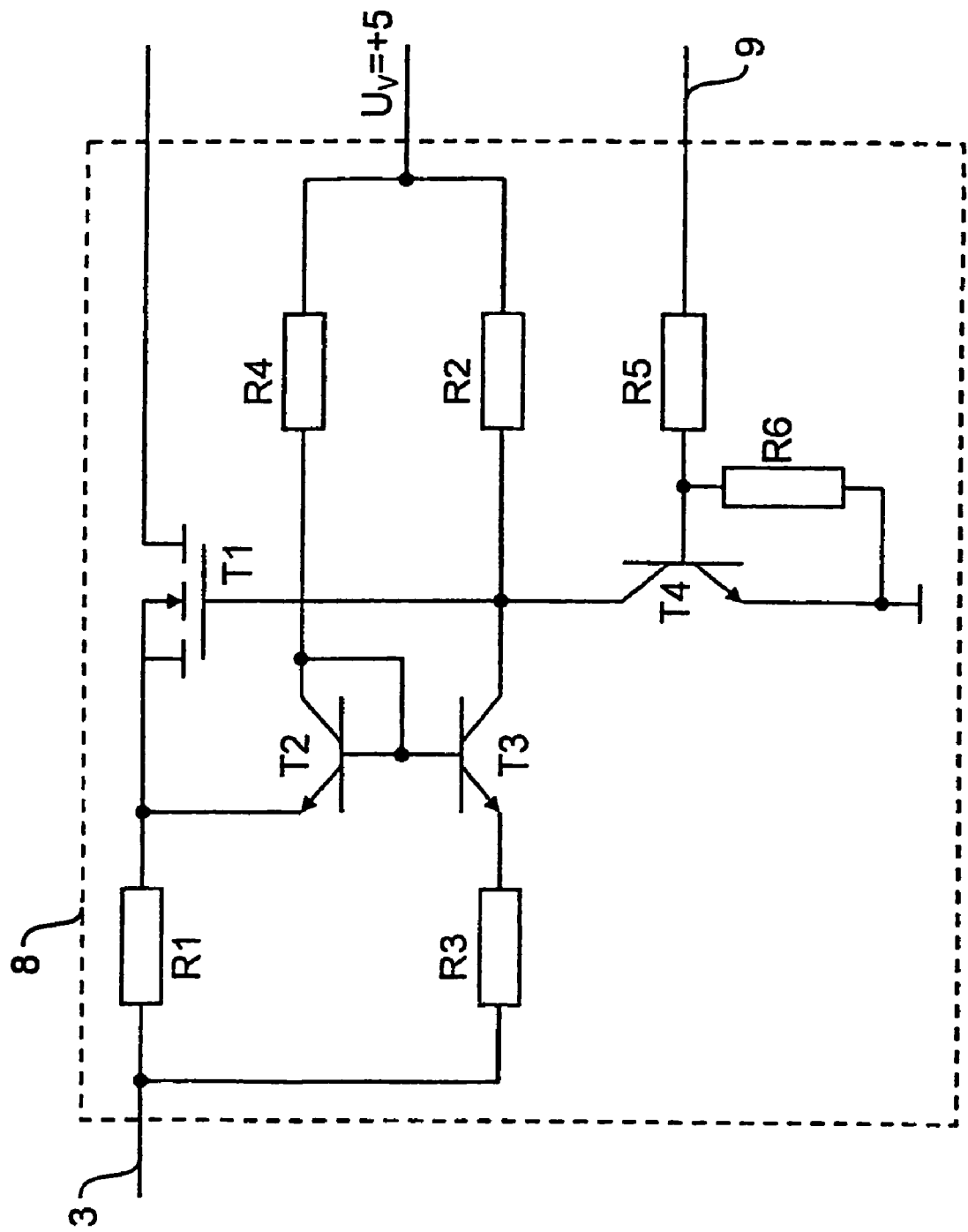
FIG. 2 shows a current limitation circuit of the sensor protection circuit in FIG. 1.

The sensor protection circuit 1 therefore comprises a current limiting device 8, which is arranged in the ground line 3 for the sensor unit 2 and measures the current through the ground line 3, with the current limiting device 8 being shown in detail in FIG. 2 and described below.

The current limiting device 8 has a measurement resistor R1 for which is arranged in the ground line 3, so that the voltage drop through the measurement resistor R1 reflects the current which flows through the ground line 3.

Furthermore, a MOSFET transistor T1 is arranged in the ground line 3, which, as a function of its activation, enables both a current limitation as well as a complete disconnection of the ground line 3 in the event of a short circuit.

The gate connection of the MOSFET transistor is connected to the supply current $U_v=+5V$ via a resistor R2, so that the MOSFET transistor T1 through connects during normal operation.

Furthermore, the gate connection of the MOSFET transistor T1 is connected to the output of a comparator circuit comprising two resistors R3, R4 and two transistors T2 and T3. The comparator circuit is connected on one side to the measurement resistor R1 and thus detects the electrical current flowing through the ground line 3. The comparator circuit controls the gate connection of the MOSFET transistor T1 as a function of the electrical current flowing through the ground line 3, such that the current is limited in order to prevent damage to the sensor 6 in the event of a short circuit.

The current limiting device 8 further comprises a transistor T4 which connects the gate connection of the MOSFET transistor T1 to ground, so that the MOSFET transistor T1 disconnects the ground line 3 if the transistor T4 through connects, since the potential of the gate connection of the MOSFET transistor T1 is drawn towards ground. Transistor T4 is activated via a separate control unit 9 and two resistors R5, R6 connected in series by means of a software control, which disconnects the MOSFET transistor T1 if the short circuit lasts for a predetermined period of time.

Furthermore, the sensor protection circuit 1 used to protect the sensor 6 also comprises a passive protective circuit with two Zener diodes D3, D4 and three capacitors C2, C3 and C4.

The Zener diode D3 is thus switched between the signal line 7 and the ground line 3 and prevents an output-side overload of the sensor 6 with a short circuit between the electric system voltage of 42 V and the signal line 7. The breakdown voltage of the Zener diode D3 thus amounts here to $U_{Z3}=8V$ and is thus lower than the Zener voltage $U_{Z1}=16V$ of the Zener diode D1. This is advantageous since a possible short circuit current can then only flow through the Zener diode D1 during a short build-up time and is subsequently taken over by the Zener diode D3. In this way the Zener diode D1 must only carry a possible short circuit current for a relatively short amount of time, thereby preventing an overload of the passive protective circuit of the sensor unit 2.

In contrast, the Zener diode D4 is switched between the voltage line 4 and the ground line 3, and prevents an input-side overload of the sensor 6 in the event of a short circuit between the electric system network voltage of 42 V and the voltage line 4. The breakdown voltage of the Zener diode D4 here amounts similarly to $U_{Z4}=8V$ and is thus lower than the Zener voltage $U_{Z2}=16V$ of the Zener diode D2. This is advantageous, since a possible short circuit current only flows through the Zener diode D2 during a short build-up time, and is subsequently taken over by the Zener diode D4. In this manner, the Zener diode D2 must only carry a possible short circuit current for a relatively short time span, thereby preventing an overload of the passive protective circuit of the sensor unit 2.

The capacitor C2 is switched between the signal line 7 and ground and thus buffers EMC spikes on signal line 7, which also counteracts an output-side overload of the sensor 6.

In contrast, the capacitor C3 connects the voltage line 4 to the ground line 3, thereby buffering voltage fluctuations at the input of the sensor unit 2 and taking over the current.

Finally, the capacitor C4 connects the ground line 3 to ground, which attenuates EMC fluctuations of the ground potential on the ground line 3.

In the event of a short circuit after a short build-up time, the passive protective circuit of the sensor protection circuit 1 takes over the short circuit current of the passive protective circuit of sensor unit 2, thereby preventing an overload of the passive protective circuit of the sensor unit 2.

The current limiting device 8 limits the short circuit current to the ground line 3, in order to prevent an overload of the passive protective circuit of the sensor protection circuit 1. With a continuous short circuit the control input 9 of the current limiting device 8 is then activated, whereupon the MOSFET transistor T1 completely disconnects the ground line 3.

The invention is not restricted to the aforementioned preferred exemplary embodiment. In fact, a number of variants and modifications are possible which similarly make use of the inventive idea and thus fall into the protected zone.

I claim:

1. A sensor protection circuit for at least one sensor, the protection circuit which comprises:
    at least one supply line for supplying current to the sensor;
    a current measuring unit for detecting an electric current flowing through said supply line for preventing damage to the sensor from excess voltage;
    said current measuring unit having connected thereto at least one of a current limiting device for limiting the electric current and a circuit element for disconnecting said at least one supply line; and
    a separate control input connected to said circuit element, in a case of a short circuit lasting for a predetermined period of time said separate control input driving said circuit element into a non-conducting state resulting in said at least one supply line being disconnected.

2. The sensor protection circuit according to claim 1, wherein said supply line monitored by the current measuring unit is a ground line for the sensor.

3. The sensor protection circuit according to claim 1, which further comprises a signal line for recording a sensor signal from the sensor.

4. The sensor protection circuit according to claim 1, which comprises a voltage line and a ground line each connected to and supplying current to the sensor.

5. The sensor protection circuit according to claim 4, which comprises means for preventing excess voltages connected in at least one of said voltage line, said ground line, and a signal line connected to the sensor.

6. The sensor protection circuit according to claim 5, wherein said means includes at least one of a Zener diode and at least one capacitor.

7. The sensor protection circuit according to claim 6, wherein said Zener diode and/or said at least one capacitor is connected between the voltage line or the signal line and the ground line.

8. A sensor protection circuit for at least one sensor, the sensor protection circuit comprising:
    at least one supply line for supplying current to the sensor, said at least one supply line including a voltage line and a ground line each connected to and supplying the current to the sensor;
    a current measuring unit for detecting an electric current flowing through said supply line for preventing damage to the sensor from excess voltage;
    said current measuring unit having connected thereto at least one of a current limiting device for limiting the electric current and a circuit element for disconnecting said at least one supply line;
    means for preventing excess voltages connected in at least one of said voltage line, said ground line, and a signal line connected to the sensor, said means having at least one of a Zener diode and at least one capacitor; and
    said sensor containing at least one Zener diode for short circuit protection, and said Zener diode for preventing excess voltages having a lower breakdown voltage than said Zener diode of said sensor.

9. In combination with a motor vehicle, a sensor protection circuit for a sensor connected in an electric circuit of the motor vehicle, the sensor protection circuit according to claim 1.

* * * * *